(12) United States Patent
Seok et al.

(10) Patent No.: US 12,089,275 B2
(45) Date of Patent: *Sep. 10, 2024

(54) MULTIPLE-BSSID SUPPORT IN MULTI-LINK OPERATION IN WIRELESS COMMUNICATIONS

(71) Applicant: MediaTek Singapore Pte. Ltd., Singapore (SG)

(72) Inventors: Yongho Seok, San Jose, CA (US); Kai Ying Lu, San Jose, CA (US); Gabor Bajko, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,586

(22) Filed: May 4, 2023

(65) Prior Publication Data

US 2023/0276517 A1    Aug. 31, 2023

Related U.S. Application Data

(63) Continuation of application No. 17/235,029, filed on Apr. 20, 2021, now Pat. No. 11,672,039.

(60) Provisional application No. 63/013,584, filed on Apr. 22, 2020.

(51) Int. Cl.
*H04W 4/00* (2018.01)
*H04W 48/16* (2009.01)
*H04W 76/11* (2018.01)
*H04W 76/15* (2018.01)
*H04W 84/12* (2009.01)

(52) U.S. Cl.
CPC ........... *H04W 76/15* (2018.02); *H04W 48/16* (2013.01); *H04W 76/11* (2018.02); *H04W 84/12* (2013.01)

(58) Field of Classification Search
CPC ...... H04W 76/15; H04W 76/11; H04W 48/16
USPC ........................................ 370/328
See application file for complete search history.

(56) References Cited

U.S. PATENT DOCUMENTS

| 2019/0215884 A1 | 7/2019 | Patil et al. |
| 2019/0268956 A1 | 8/2019 | Xiao et al. |
| 2019/0335454 A1 | 10/2019 | Huang et al. |
| 2020/0396568 A1 | 12/2020 | Huang et al. |
| 2021/0014911 A1 | 1/2021 | Patil et al. |
| 2021/0051574 A1 | 2/2021 | Chu et al. |

(Continued)

FOREIGN PATENT DOCUMENTS

| CN | 112449376 A | 3/2021 |
| TW | 1511512 | 12/2015 |

OTHER PUBLICATIONS

European Patent Office, European Search Report for European Patent Application No. 21169852.7, Oct. 6, 2021.

(Continued)

*Primary Examiner* — Temica M Beamer
(74) *Attorney, Agent, or Firm* — Andy M. Han; Han IP PLLC

(57) ABSTRACT

A plurality of different medium access control (MAC) addresses are assigned to a plurality of virtual access point (AP) multi-link devices (MLDs) that are implemented within a physical AP MLD such that each of the plurality of virtual AP MLDs is assigned a respective MAC address of the plurality of different MAC addresses. Wireless communications are then established with one or more stations (STAs) over a plurality of links.

20 Claims, 13 Drawing Sheets

(56) References Cited

U.S. PATENT DOCUMENTS

2021/0076437 A1 3/2021 Kneckt et al.

OTHER PUBLICATIONS

Abhishk Patil (Qualcomm), "Multi-BSSID Operation with MLO", IEEE Draft, 11-20-0357-00-00BE-MLO-Container-Structure-for-Capability-Advertisement, IEEE-SA Mentor, Piscataway, NJ, USA, vol. 802.11 EHT; 802.11be, Apr. 9, 2020, pp. 1-27, XP068167434.
Abhishk Patil (Qualcomm), "MLO: Container Structure for Capability Advertisement", IEEE Draft, 11-20-0358-00-00BE-Multi-BSSID-Operation-With-MLO, IEEE-SA Mentor, Piscataway, NJ, USA, vol. 802.11 EHT, 802.11be, Mar. 15, 2020, pp. 1-13, XP068167070.
Abhishk Patil (Qualcomm), "MLO: Discovery and beacon-bloating", IEEE Draft, 11-20-0356-00-00BE-MLO-Discovery-and-Beacon-Bloating, IEEE-SA Mentor, Piscataway, NJ, USA, vol. 802.11 EHT, 802.11be, Mar. 15, 2020, pp. 1-16, XP068167069.
Insun Jang (LG Electronics), Indication of Multi-link Information, IEEE Draft, 11-20-0028-02-00BE-Indication-of-Multi-Link-Information, IEEE-SA Mentor, Piscataway, NJ, USA, vol. 802.11 EHT, 802.11be, No. 2, Mar. 16, 2020, pp. 1-14, XP068167113.
Taiwan Intellectual Property Office, Office Action for Taiwan Patent Application No. 110114489, Nov. 30, 2021.
Taiwan Intellectual Property Office, Office Action for Taiwan Patent Application No. 110114489, Aug. 12, 2022.
Abhishk Patil et al., "Resolution for CIDs related to Multiple BSSID—Part 2", IEEE 802.11-18/1814r2, Oct. 15, 2018 (https://mentor.ieee.org/802.11/dcn/18/11-18-1814-02-00ax-resolution-for-cids-related-to-multiple-bssid-part-2.docx) 11.1.3.8.
"802.11—TIM and DTIM Information Elements", by gstefanick posted Jan. 25, 2016 (https://community.arubanetworks.com/browse/articles/blogviewer?blogkey=f9704ec4-0edd-4a8f-b545-0ad938fc646a).
Abhishek Patil et al. (Qualcomm), "Container for advertising ML Information", IEEE 802.11-20/0357r0, Mar. 15, 2020.
China National Intellectual Property Administration, First Office Action in China Patent Application No. 202110949047.2, Apr. 25, 2024.
Qualcomm: "Multi-BSSID Operation with MLO", IEEE 802.11-19/0358r0, Mar. 15, 2020.

200

| Element ID | Length | Element ID Extension | Link ID | Optional Subelements |
|---|---|---|---|---|
| 1 Octet | 1 Octet | 1 Octet | 1 Octet | Variable |

(A)

| Element ID | Length | Element ID Extension | Link ID | Change Sequence |
|---|---|---|---|---|
| 1 Octet | 1 Octet | 1 Octet | 1 Octet | 1 Octet |

| ORDER | INFORMATION | NOTES |
|---|---|---|
| 1 | TIMESTAMP | |
| 2 | BEACON INTERVAL | |
| 3 | CAPABILITY INFORMATION | |
| 4 | SERVICE SET IDENTIFIER (SSID) | |
| ... | | |
| 22 | CHANGE SEQUENCE | PROVIDES THE CHANGE SEQUENCE ASSOCIATED WITH THE TRANSMITTED BSSID |
| ... | | |
| 27 | MULTIPLE BSSID | PROVIDES THE NON-TRANSMITTED BSSIDS ON LINK ASSOCIATED WITH THE TRANSMITTED BSSID |
| ... | | |
| 63 | REDUCED NEIGHBOR REPORT | PROVIDES THE LINK ID MAPPING TO THE OPERATING CLASS, THE CHANNEL NUMBER, AND THE BSSID FOR EACH LINK |
| ... | | |
| LAST | MULTIPLE LINK | PROVIDES THE BSSIDS IN OTHER LINKS THAT ARE CONSTITUTING THE AP MLD WITH THE TRANSMITTED BSSID |

FIG. 5

| Order | Information | Notes |
|---|---|---|
| 1 | Timestamp | |
| 2 | Beacon Interval | |
| 3 | Capability Information | |
| 4 | Service Set Identifier (SSID) | |
| ... | | |
| 22 | Change Sequence | Provides the Change Sequence associated with the transmitted BSSID |
| ... | | |
| 27 | Multiple BSSID | Provides the non-transmitted BSSIDs on link associated with the transmitted BSSID |
| ... | | |
| 63 | Reduced Neighbor Report | Provides the Link ID mapping to the operating class, the channel number, and the BSSID for each link |
| ... | | |
| Last - 1 | AP MLD MAC Address | Provides the MAC address of the AP MLD |
| Last | Multiple Link | Provides the BSSIDs in other links that are constituting the AP MLD with the transmitted BSSID |

ASSIGN A PLURALITY OF DIFFERENT MEDIUM ACCESS CONTROL (MAC) ADDRESSES TO A PLURALITY OF VIRTUAL ACCESS POINT (AP) MULTI-LINK DEVICES (MLDs) THAT ARE IMPLEMENTED WITHIN A PHYSICAL AP MLD SUCH THAT EACH OF THE PLURALITY OF VIRTUAL AP MLDs IS ASSIGNED A RESPECTIVE MAC ADDRESS OF THE PLURALITY OF DIFFERENT MAC ADDRESSES
1210

ESTABLISH WIRELESS COMMUNICATIONS WITH ONE OR MORE STATIONS (STAs) OVER A PLURALITY OF LINKS
1220

FIG. 12

1300 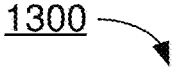

```
ESTABLISH A WIRELESS COMMUNICATION WITH A FIRST
VIRTUAL ACCESS POINT (AP) MULTI-LINK DEVICE (MLD)
OF A PLURALITY OF VIRTUAL AP MLDs THAT ARE
IMPLEMENTED WITHIN A PHYSICAL AP MLD OVER A
FIRST LINK OF A PLURALITY OF LINKS SUCH THAT: (A)
EACH OF THE PLURALITY OF VIRTUAL AP MLDs IS
ASSIGNED A RESPECTIVE MEDIUM ACCESS CONTROL
(MAC) ADDRESS OF A PLURALITY OF DIFFERENT MAC
ADDRESSES, AND (B) EACH OF THE PLURALITY OF
VIRTUAL AP MLDs OPERATES ON EACH OF THE
PLURALITY OF LINKS UNDER A RESPECTIVE ONE OF A
PLURALITY OF DIFFERENT BASIC SERVICE SET
IDENTIFIERS (BSSIDs)
1310
```

```
RECEIVE, FROM THE FIRST VIRTUAL AP MLD, A
BEACON FRAME CONTAINING CAPABILITIES AND
OPERATING PARAMETERS OF A FIRST BSSID OF THE
PLURALITY OF DIFFERENT BSSIDs UNDER WHICH THE
FIRST VIRTUAL AP MLD OPERATES ON AT LEAST THE
FIRST LINK OF THE PLURALITY OF LINKS
1320
```

FIG. 13

MULTIPLE-BSSID SUPPORT IN MULTI-LINK OPERATION IN WIRELESS COMMUNICATIONS

CROSS REFERENCE TO RELATED PATENT APPLICATION

The present disclosure is part of a Continuation of U.S. patent application Ser. No. 17/235,029, filed on 20 Apr. 2021 and claiming the priority benefit of U.S. Provisional Patent Application No. 63/013,584, filed on 22 Apr. 2020. Contents of aforementioned applications are herein incorporated by reference in their entirety.

TECHNICAL FIELD

The present disclosure is generally related to wireless communications and, more particularly, to multiple-basic service set identifier (BSSID) support in multi-link operation in wireless communications.

BACKGROUND

Unless otherwise indicated herein, approaches described in this section are not prior art to the claims listed below and are not admitted as prior art by inclusion in this section.

For next-generation wireless communications such as those in a wireless local area network (WLAN) according to the Institute of Electrical and Electronics Engineers (IEEE) 802.11 specifications, multi-link framework has been proposed and a multi-link device (MLD) is a device having a medium access control (MAC) address that identifies the MLD management entity. For example, the MAC address can be used in multi-link setup between an access point (AP) MLD and a non-AP MLD. On a high level, an MLD MAC address is used to identify and differentiate different MLDs. A station (STA) wireless medium (WM) MAC address is used for on-the-air transmission on the corresponding medium.

For an AP MLD to continue to serve legacy STAs of high-throughput (HT), very-high-throughput (VHT) or high-efficiency (HE) operations under the IEEE 802.11 standards, each affiliated AP of an AP MLD is to use a different MAC address. However, there exists ambiguity when two affiliated APs of an AP MLD use the same MAC address. For example, if AP1 and AP2 of an AP MLD use the same MAC address, it would be difficult for legacy STAs to know if AP2 is a different from AP1 or if AP2 is actually AP1 performing channel switching. Thus, there is a need for a solution to address the relation between MAC addresses and affiliated APs of an AP MLD.

For a non-AP MLD, if an AP MLD uses different MAC addresses for affiliated STAs, it would make sense to have symmetric operation for the non-AP MLD as well. The non-AP MLD may serve as a soft AP for peer-to-peer communication, and symmetric operation would simplify implementation consideration. Moreover, transmission from the non-AP MLD to the AP MLD in different links may have the same nonce for different messages if affiliated non-AP STAs have the same MAC address under the same packet number (PN) space and/or pairwise transient key (PTK), which would destroy the security property. Thus, there is a need for a solution to address the relation between MAC addresses and affiliated non-APs of a non-AP MLD.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to multiple-BSSID support in multi-link operation in wireless communications. Under various proposed schemes in accordance with the present disclosure, the aforementioned issues may be addressed.

In one aspect, a method may involve assigning a plurality of different MAC addresses to a plurality of virtual AP MLDs that are implemented within a physical AP MLD such that each of the plurality of virtual AP MLDs is assigned a respective MAC address of the plurality of different MAC addresses. The method may also involve establishing wireless communications with one or more stations (STAs) over a plurality of links.

In another aspect, a method may involve establishing a wireless communication with a first virtual AP MLD of a plurality of virtual AP MLDs that are implemented within a physical AP MLD over a first link of a plurality of links such that: (a) each of the plurality of virtual AP MLDs is assigned a respective MAC address of a plurality of different MAC addresses, and (b) each of the plurality of virtual AP MLDs operates on each of the plurality of links under a respective one of a plurality of different BSSIDs. The method may also involve receiving, from the first virtual AP MLD, a beacon frame containing capabilities and operating parameters of a first BSSID of the plurality of different BSSIDs under which the first virtual AP MLD operates on at least the first link of the plurality of links.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5$^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of example designs in accordance with the present disclosure.

FIG. 5 is a diagram of an example design in accordance with the present disclosure.

FIG. 10 is a diagram of an example design in accordance with the present disclosure.

FIG. 12 is a flowchart of an example process in accordance with an implementation of the present disclosure.

FIG. 13 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to multiple-BSSID support in multi-link operation in wireless communications. According to the present disclosure, a number of possible solutions may be implemented separately or jointly. That is, although these possible solutions may be described below separately, two or more of these possible solutions may be implemented in one combination or another.

Figure 1:
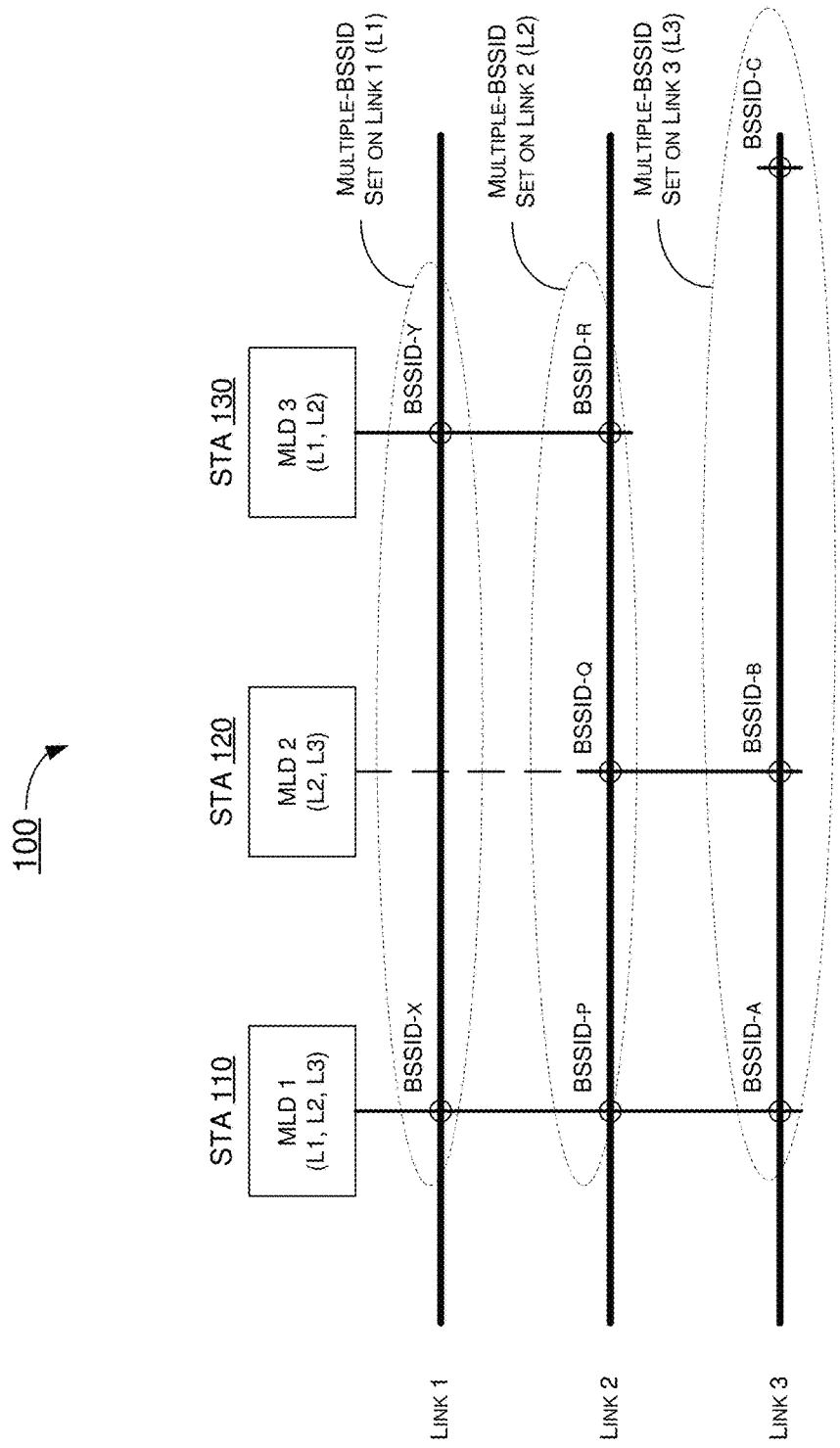
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 13 illustrate examples of implementation of various proposed schemes in network environment 100 in accordance with the present disclosure. The following description of various proposed schemes is provided with reference to FIG. 1~FIG. 13.

Referring to FIG. 1, network environment 100 may involve a STA 110, a STA 120 and STA 130 communicating wirelessly over multiple links (e.g., link 1, link 2 and link 3) in accordance with one or more Institute of Electrical and Electronics Engineers (IEEE) 802.11 standards. Each of STA 110, STA 120 and STA 130 may function as an AP MLD or a non-AP MLD. For instance, multiple virtual AP MLDs may operate within STA 110. Correspondingly, multiple virtual non-AP MLDs may operate within each of STA 120 and STA 130. For illustrative purposes and without limiting the scope of the present disclosure, STA 110 may communicate over link 1 (L1), link 2 (L2) and link 3 (L3) under BSSID-x, BSSID-p and BSSID-a, respectively. STA 120 may communicate over link 2 (L2) and link 3 (L3) under BSSID-q and BSSID-b, respectively, and STA 130 may communicate over link 1 (L1) and link 2 (L2) under BSSID-y and BSSID-r, respectively. Optionally, there may be another MLD operating on link 3 (L3) under BSSID-c. Accordingly, BSSID-x and BSSID-y may be considered a multiple-BSSID set on link 1. Similarly, BSSID-p, BSSID-q and BSSID-r may be considered a multiple-BSSID set on link 2. Likewise, BSSID-a, BSSID-b and BSSID-c may be considered a multiple-BSSID set on link 3. Under various proposed schemes in accordance with the present disclosure, STA 110, STA 120 and STA 130 may be configured to perform multiple-BSSID support in multi-link operation in wireless communications according to various proposed schemes described herein.

For legacy association, an AP differentiates different associated non-AP STAs through MAC addresses of the non-AP STAs. For a multi-link setup, differentiation of different non-AP MLDs may require a similar identifier such as the MAC address of the non-AP MLD. Knowing the MAC address of a non-AP MLD after setup would be useful for subsequent negotiations such as for security and block acknowledgement (BA). It is noteworthy, however, that an identifier with a smaller size may lead to identifier collision and confusion of setup result. On the other hand, without an identifier, differentiation of different non-AP MLDs may need to be based on all the configuration details of the non-AP MLDs, and it may be difficult to discern differences like re-setup with different configurations. Thus, under a proposed scheme in accordance with the present disclosure, the MAC address of a non-AP MLD may be indicated during a multi-link setup procedure.

For legacy association, the MAC address of an associated AP is known before association. For a multi-link setup, it not yet defined as to whether an AP MLD discovery may provide the MAC address of the AP MLD. In case the AP MLD address is not known before the multi-link setup, then having the AP MLD address in multi-link setup procedure may be useful for subsequent negotiations such as for security and BA. In case the AP MLD address is known before multi-link setup, then having the AP MLD address in the multi-link setup procedure may be useful to confirm the destined MLD for setup and to avoid unknown corner cases. Thus, under a proposed scheme in accordance with the present disclosure, the MAC address of an AP MLD may be indicated during the multi-link setup procedure.

In general, a STA within an AP MLD may send an information element (IE) regarding BSS parameters associated with another STA within the AP MLD. Under a proposed scheme in accordance with the present disclosure, a new Multiple-Link IE may be utilized to encapsulate the BSS parameters (e.g., information elements) of STAs within the same AP MLD that are different from the STA that is transmitting the Multiple-Link IE. Part (A) of FIG. 2 shows an example design 210 of a Multiple-Link IE. Referring to design 210, the Multiple-Link IE may include an element ID field (e.g., with a length of 1 octet), a length field (e.g., with a length of 1 octet), an element ID extension field (e.g., with a length of 1 octet), a Link ID filed (e.g., with a length of 1 octet), and an optional sub-elements field (e.g., with a variable length).

Additionally, a STA within an AP MLD may send a Change Sequence IE to indicate a change of system information within a BSS associated with another STA within the AP MLD. In such cases, the optional sub-elements field in the Multiple-Link IE may contain the Change Sequence IE. Alternatively, a new Multi-Link Change Sequence IE may be defined. Part (B) of FIG. 2 shows an example design 220 of a Multi-Link Change Sequence IE. Referring to design 220, the Multi-Link Change Sequence IE may include an element ID field (e.g., with a length of 1 octet), a length field (e.g., with a length of 1 octet), an element ID extension field (e.g., with a length of 1 octet), a Link ID filed (e.g., with a length of 1 octet), and a change sequence field (e.g., with a length of 1 octet). The Change Sequence field in the Multi-Link Change Sequence IE may be 1 octet in length and may be defined as an unsigned integer, initialized to 0, that may increment when a critical update occurs to any of the elements inside a Beacon frame sent on the link indicated by the Link ID by a STA within the AP MLD. The STA within the AP MLD may increase the value (e.g., modulo 256) of the Change Sequence field in the next transmitted Beacon frame(s) when a critical update occurs to any of the elements inside the Beacon frame sent on the link indicated by the Link ID by another STA within the AP MLD. Events which may be classified as a critical update may include, for example and without limitation: (a) inclusion of an Extended Channel Switch Announcement, (b) inclusion of a BSS Color Change Announcement, (c) modification of enhanced distributed channel access (EDCA) parameters, (d) modification of a multi-user (MU) EDCA Parameter Set element, and (e) modification of a Spatial Reuse Parameter Set element. The STA within the AP MLD may classify other changes in the Beacon frame as critical updates. When multiple BSSID are enabled, all AP STAs (transmitted BSSID or non-transmitted BSSID) within each AP MLD may have separate Change Sequence values.

When a STA in a non-AP MLD receives a Change Sequence field that contains a value that is different from a previously received Change Sequence field associated with a STA within an AP MLD, another STA in the non-AP MLD may either be awake to receive the next Beacon frame sent on the link indicated by the Link ID by the STA within the AP MLD or queue for transmission of a Probe Request frame to the STA within the AP MLD.

Figure 3:
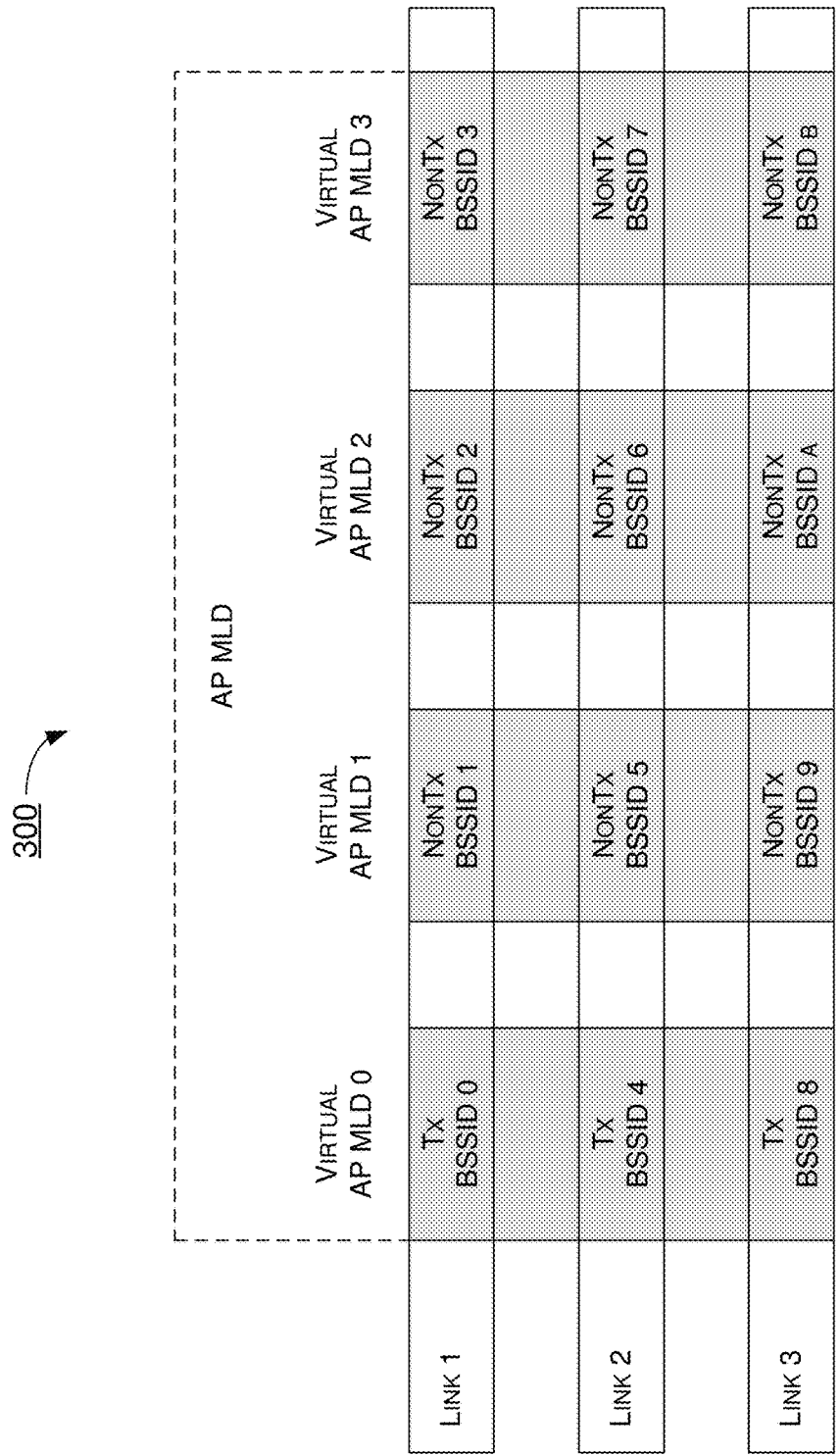
FIG. 3 is a diagram of an example scenario in accordance with the present disclosure.

Under a proposed scheme in accordance with the present disclosure, when a multi-link operation is served in a multiple-BSSID environment, multiple AP MLDs may be virtualized as in the case when multiple APs are virtualized on each link of multiple links using multiple AP MLD MAC addresses. FIG. 3 illustrates an example scenario 300 with respect to multiple-BSSID support in multi-link operation for multiple AP MLD MAC addresses in accordance with the present disclosure. In scenario 300, a single physical AP MLD may have multiple virtual APs (herein interchangeably referred to as "virtual AP MLDs") associated therewith, such as: virtual AP MLD 0, virtual AP MLD 1, virtual AP MLD 2 and virtual AP MLD 3. Moreover, in scenario 300, for multi-link operations with support for multiple BSSIDs, each of the virtual AP MLDs may operate (e.g., transmit) on each of one or more of multiple links under a respective BSSID. For instance, virtual AP MLD 0 may operate on link 1, link 2 and link 3 under a transmitted (Tx) BSSID 0, Tx BSSID 4 and Tx BSSID 8, respectively. Similarly, virtual AP MLD 1 may operate on link 1, link 2 and link 3 under non-transmitted (NonTx) BSSID 1, NonTx BSSID 5 and NonTx BSSID 9, respectively. Likewise, virtual AP MLD 2 may operate on link 1, link 2 and link 3 under NonTx BSSID 2, NonTx BSSID 6 and NonTx BSSID a, respectively. Additionally, virtual AP MLD 3 may operate on link 1, link 2 and link 3 under NonTx BSSID 3, NonTx BSSID 7 and NonTx BSSID b, respectively.

Figure 4:
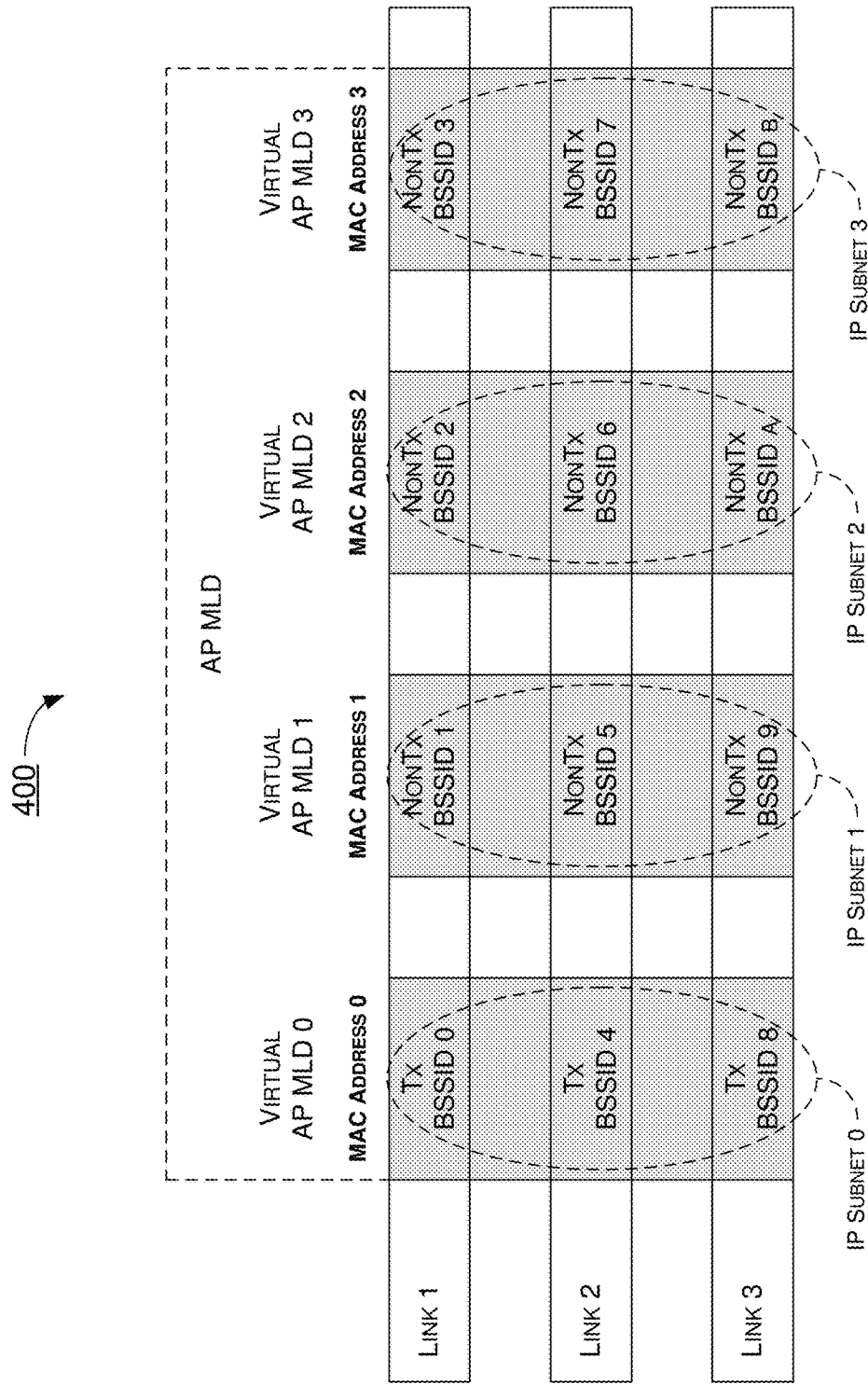
FIG. 4 is a diagram of an example scenario in accordance with the present disclosure.

Under the proposed scheme, each virtual AP MLD may have separate AP MLD MAC address for establishing a separate administrative domain. For instance, when a virtual private network (VPN) served by each virtual AP MLD operates on separate Internet Protocol (IP) subnet, each virtual AP MLD may need an independent MAC address. FIG. 4 illustrates an example scenario 400 with respect to multiple-BSSID support in multi-link operation for multiple AP MLD MAC addresses in accordance with the present disclosure. In scenario 400, each of virtual AP MLD 0, virtual AP MLD 1, virtual AP MLD 2 and virtual AP MLD 3 of a physical AP MLD may have a respective MAC address. For instance, virtual AP MLD 0 may be assigned an AP MLD MAC address 0, virtual AP MLD 1 may be assigned an AP MLD MAC address 1, virtual AP MLD 2 may be assigned an AP MLD MAC address 2, and virtual AP MLD 3 may be assigned an AP MLD MAC address 3. Accordingly, AP MLD MAC address 0 may correspond to an IP subnet 0 on link 1, link 2 and link 3, AP MLD MAC address 1 may correspond to an IP subnet 1 on link 1, link 2 and link 3, AP MLD MAC address 2 may correspond to an IP subnet 2 on link 1, link 2 and link 3, and AP MLD MAC address 3 may correspond to an IP subnet 3 on link 1, link 2 and link 3.

Under the proposed scheme, the MAC address of each virtual AP MLD may be provided as a pair of {BSSID index, AP MLD MAC address}. Each virtual AP MLD may be constituted either from non-transmitted BSSIDs having the same BSSID index or from transmitted BSSIDs. In case a virtual AP MLD is allowed to be constituted from non-transmitted BSSIDs having different BSSID indices or from a combination of transmitted BSSID(s) and non-transmitted BSSID(s), the AP MLD may need additional signaling to configure the BSSIDs belonging to the same virtual AP MLD.

Under a proposed scheme in accordance with the present disclosure, capabilities and operational parameters of virtual AP MLDs having different MAC addresses in multi-link operations may be signaled in a certain way. For instance, Tx BSSID 0 may transmit a Beacon frame that contains the capabilities and operational parameters of Tx BSSID 0. Additionally, the Beacon frame may also include Multiple-BSSID IEs that contain the capabilities and operational parameters of NonTx BSSID 1, NonTx BSSID 2 and NonTx BSSID 3. Moreover, the Beacon frame may further include Multiple-Link IEs that contain the capabilities and operational parameters of Tx BSSID 4 and Tx BSSID 8 that are member of virtual AP MLD 0.

In the Multiple-BSSID IE of the Beacon frame, the Multiple-Link IE of the non-transmitted BSSID profile sub-element associated with BSSID index 1 may contain the capabilities and operational parameters of NonTx BSSID 5 and NonTx BSSID 9 that are member of virtual AP MLD 1. Similarly, the Multiple-Link IE of the non-transmitted BSSID profile sub-element associated with BSSID index 2 may contain the capabilities and operational parameters of NonTx BSSID 6 and NonTx BSSID a that are member of virtual AP MLD 2. Likewise, the Multiple-Link IE of the non-transmitted BSSID profile sub-element associated with BSSID index 3 may contain the capabilities and operational parameters of NonTx BSSID 7 and NonTx BSSID b that are member of virtual AP MLD 3.

Under a proposed scheme in accordance with the present disclosure, MAC address of each virtual AP MLD in multi-link operations may be signaled in a certain way. For instance, the Multiple-Link IE of the Beacon frame associated with BSSID index 0 may contain the AP MLD MAC address 0 for the virtual AP MLD 0 constituting of the Tx BSSID 0, Tx BSSID 4 and Tx BSSID 8. In the Multiple-BSSID IE of the Beacon frame, the Multiple-Link IE of the non-transmitted BSSID profile sub-element associated with BSSID index 1 may contain the AP MLD MAC address 1 for virtual AP MLD 1 constituting of NonTx BSSID 1, NonTx BSSID 5 and NonTx BSSID 9. Similarly, the Multiple-Link IE of the non-transmitted BSSID profile sub-element associated with BSSID index 2 may contain the AP MLD MAC address 2 for virtual AP MLD 2 constituting of NonTx BSSID 2, NonTx BSSID 6 and NonTx BSSID a. Likewise, the Multiple-Link IE of the non-transmitted BSSID profile sub-element associated with BSSID index 3 may contain the AP MLD MAC address 3 for virtual AP MLD 3 constituting of NonTx BSSID 3, NonTx BSSID 7 and NonTx BSSID b.

Under a proposed scheme in accordance with the present disclosure, change sequences in multi-link operations may be signaled in a certain way. For instance, the Beacon frame, which is transmitted by Tx BSSID 0, may contain the change sequence of Tx BSSID0. Moreover, the Multiple-BSSID IE in the Beacon frame may contain the change sequences of NonTx BSSID 1, NonTx BSSID2 and NonTx BSSID3. Furthermore, the Multiple-Link IE in the Beacon frame may also contain the change sequences of Tx BSSID 4 and Tx BSSID 8. In the Multiple-BSSID IE of the Beacon frame, the Multiple-Link IE of the non-transmitted BSSID profile sub-element associated with BSSID index 1 may contain the change sequences of NonTx BSSID 5 and NonTx BSSID 9. Similarly, the Multiple-Link IE of the non-transmitted BSSID profile sub-element associated with BSSID index 2 may contain the change sequences of NonTx BSSID 6 and NonTx BSSID a. Likewise, the Multiple-Link IE of the non-transmitted BSSID profile sub-element associated with BSSID index 3 may contain the change sequences of NonTx BSSID 7 and NonTx BSSID b.

FIG. 5 illustrates an example design of a Beacon frame 500 with respect to multiple-BSSID support in multi-link operation for multiple AP MLD MAC addresses in accordance with the present disclosure. Referring to FIG. 5, Beacon frame 500 may contain a plurality of informational fields such as, for example and without limitation, Timestamp, Beacon Interval, Capability Information, Service Set Identifier (SSID), Change Sequence, Multiple BSSID, Reduced Neighbor Report (RNR), and Multiple Link. The Change Sequence field may be utilized to provide the Change Sequence associated with the transmitted BSSID. The Multiple BSSID field may be utilized to provide the non-transmitted BSSIDs on link(s) associated with the transmitted BSSID. The RNR field may be utilized to provide the Link ID mapping to the operating class, the channel number, and the BSSID for each link. The Multiple Link field may be utilized to provide the BSSIDs in other links that are constituting the AP MLD with the transmitted BSSID.

Figure 6:
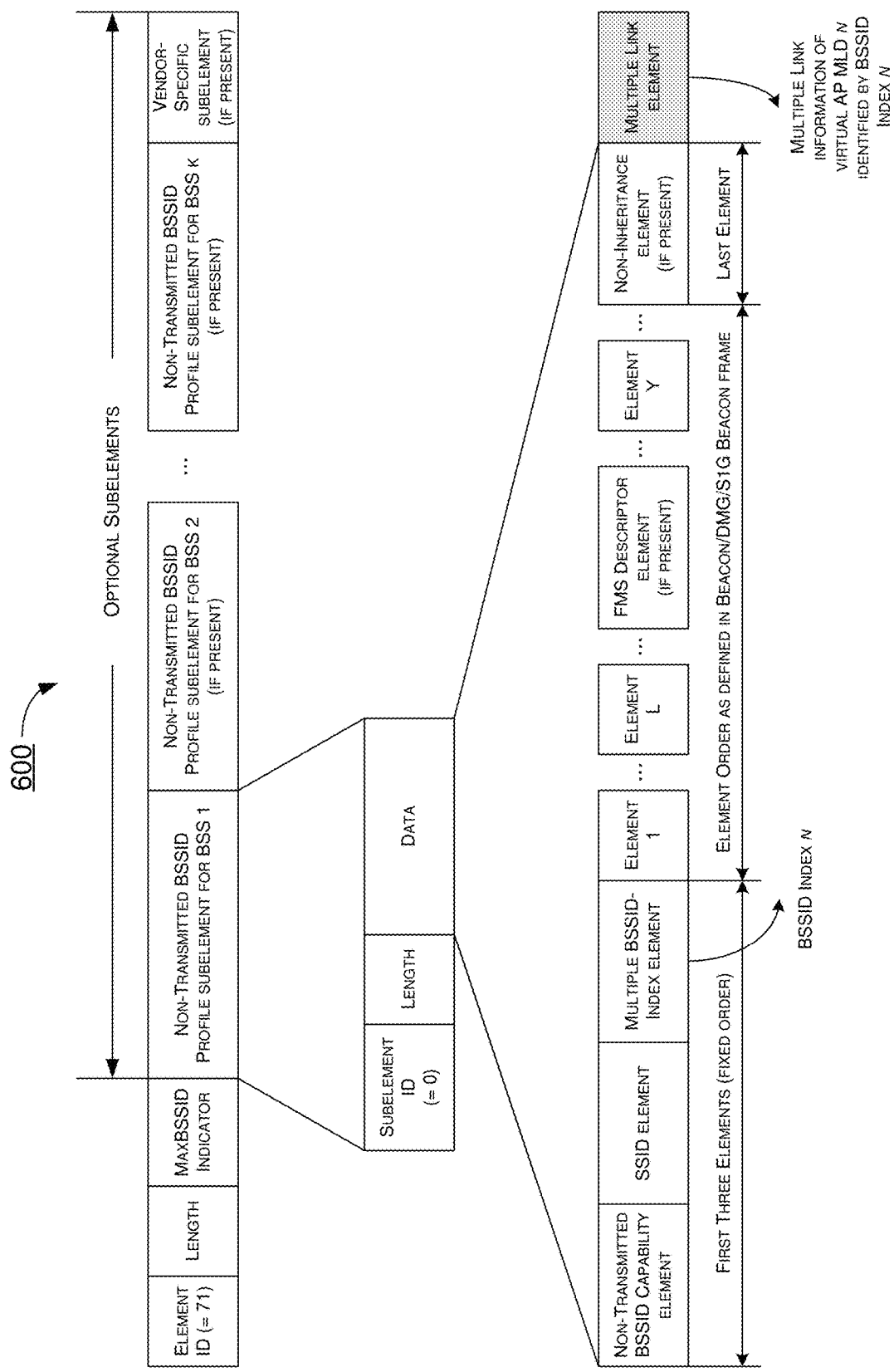
FIG. 6 is a diagram of an example design in accordance with the present disclosure.

FIG. 6 illustrates an example design of a Multiple-BSSID IE 600 with respect to multiple-BSSID support in multi-link operation for multiple AP MLD MAC addresses in accordance with the present disclosure. Referring to FIG. 6, Multiple-BSSID IE 600 may carry non-transmitted BSSID profile sub-elements with respect to various virtual AP MLDs. Multiple-BSSID IE 600 may also carry a Multiple-Link IE that contains Multiple-Link information of virtual AP MLD n identified by BSSID index n, with n>1.

Figure 7:
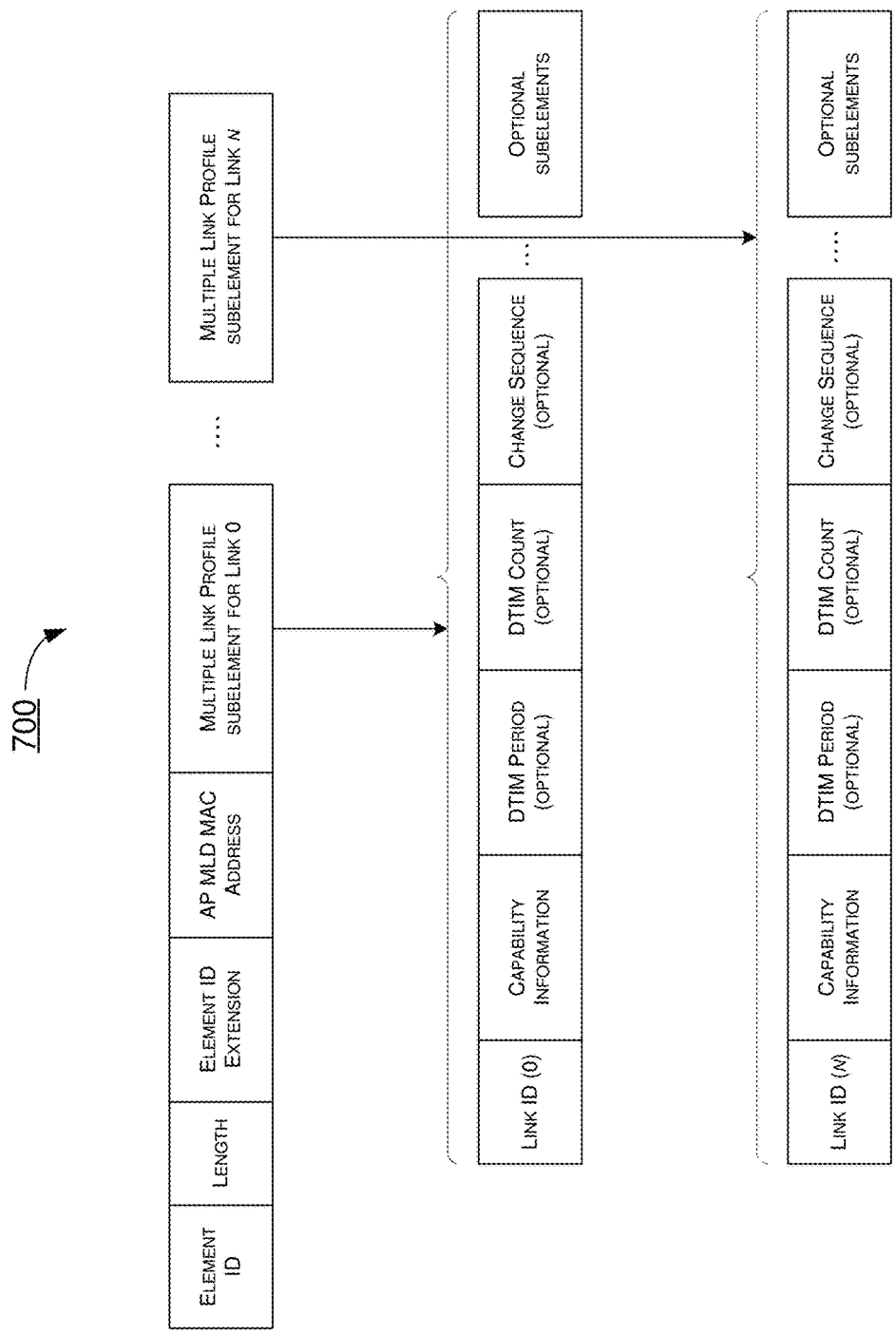
FIG. 7 is a diagram of an example design in accordance with the present disclosure.

FIG. 7 illustrates an example design of a Multiple-Link IE 700 with respect to multiple-BSSID support in multi-link operation for multiple AP MLD MAC addresses in accordance with the present disclosure. Referring to FIG. 7, Multiple-Link IE 700 may carry a plurality of Multiple Link Profile sub-elements. For instance, Multiple-Link IE 700 may carry Multiple Link Profile sub-element for link 0~Multiple Link Profile sub-element for link n, with n>1. Each Multiple Link Profile sub-element may carry a respective Link ID and capability information. Optionally, each Multiple Link Profile sub-element may also indicate a delivery traffic indication message (DTIM) period, a DTIM count, a Change Sequence, and one or more Optional sub-elements. The Link ID field may indicate a Link ID associated with link n (mapping between the link (specified in the Operating Class, Channel Number, and BSSID) and the link ID is defined in the RNR element). The capability information field may indicate capability information of the AP in the AP MLD operating on link n. The DTIM period field may indicate a DTIM period of the AP in the AP MLD operating on link n. The DTIM count field may indicate a DTIM count of the AP in the AP MLD operating on link n. The Change Sequence field may indicate a change sequence of the AP in the AP MLD operating on link n. The Optional sub-elements may indicate various information such as, for example and without limitation, Timestamp, Beacon Interval fields, direct-sequence spread spectrum (DSSS) Parameter Set, independent basic service set (IBSS) Parameter Set, Country, Channel Switch Announcement, Extended Channel Switch Announcement, Wide Bandwidth, Channel Switch, Transmit Power Envelope, Supported Operating Classes, IBSS dynamic frequency selection (DFS), Extended Rate Physical (ERP) information, High-Throughput (HT) capabilities, HT operation, Very-High-Throughput (VHT) capabilities, VHT operation, High-Efficiency (HE) capabilities, HE 6 GHz, Band Capabilities, HE Operation, BSS Color Change Announcement, and Spatial Reuse Parameter Set elements, except when the Multiple-Link IE is present in the non-transmitted BSSID profile sub-element in the Multiple-BSSID IE. In such cases, those elements are not present in the Optional sub-elements.

Figure 8:
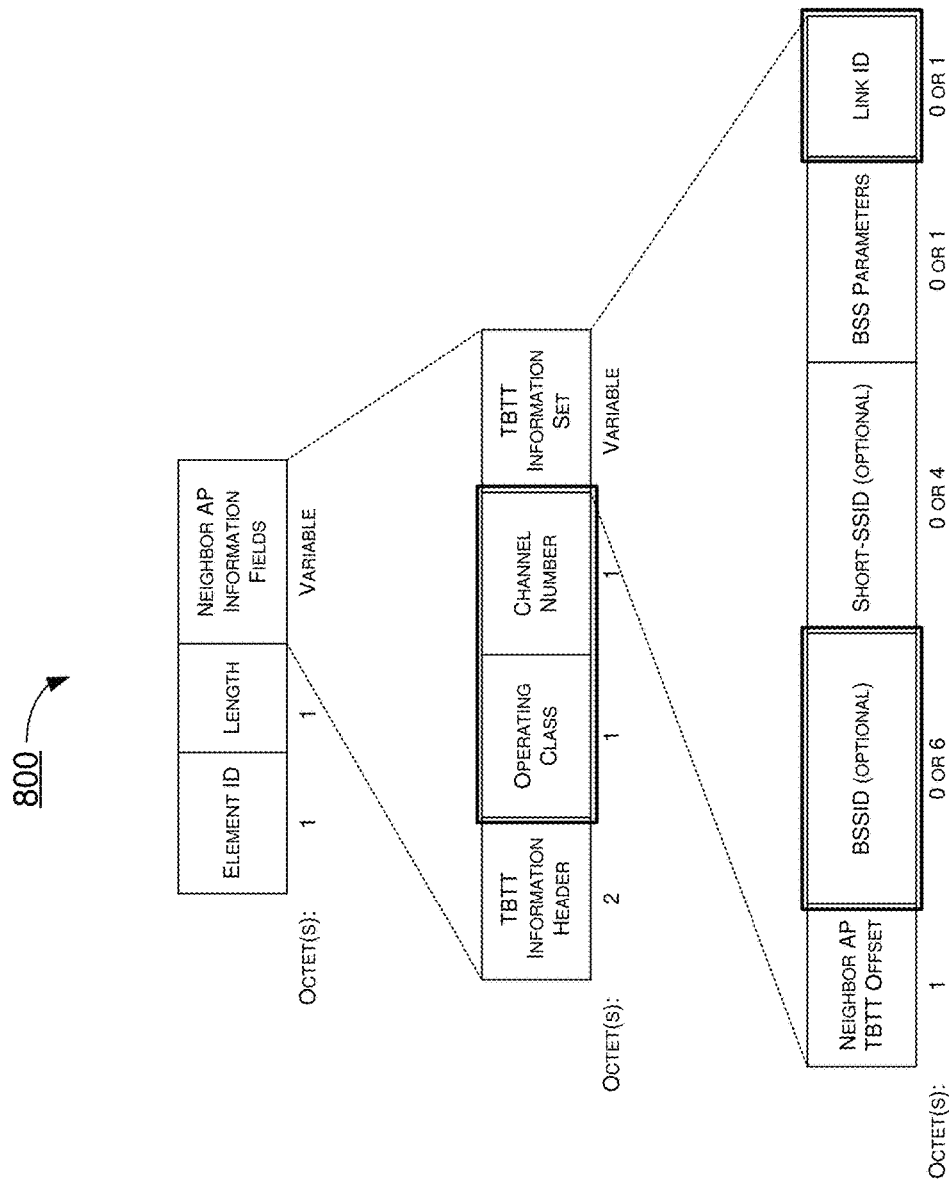
FIG. 8 is a diagram of an example design in accordance with the present disclosure.

FIG. 8 illustrates an example design of a Reduced Neighbor Report IE 800 with respect to multiple-BSSID support in multi-link operation for multiple AP MLD MAC addresses in accordance with the present disclosure. Referring to FIG. 8, Reduced Neighbor Report IE 800 may carry one or more neighbor AP information fields, which may include a target beacon transmission time (TBTT) information header, an Operating Class field, a Channel Number filed, and a TBTT information set field. The TBTT information set field may carry neighbor AP TBTT offset, BSSID (optional), short SSID (optional), BSS parameters, and Link ID. As can be seen, the RNR may define the mapping between the Link ID and the information set of {Operating Class, Channel Number, BSSID}.

Figure 9:
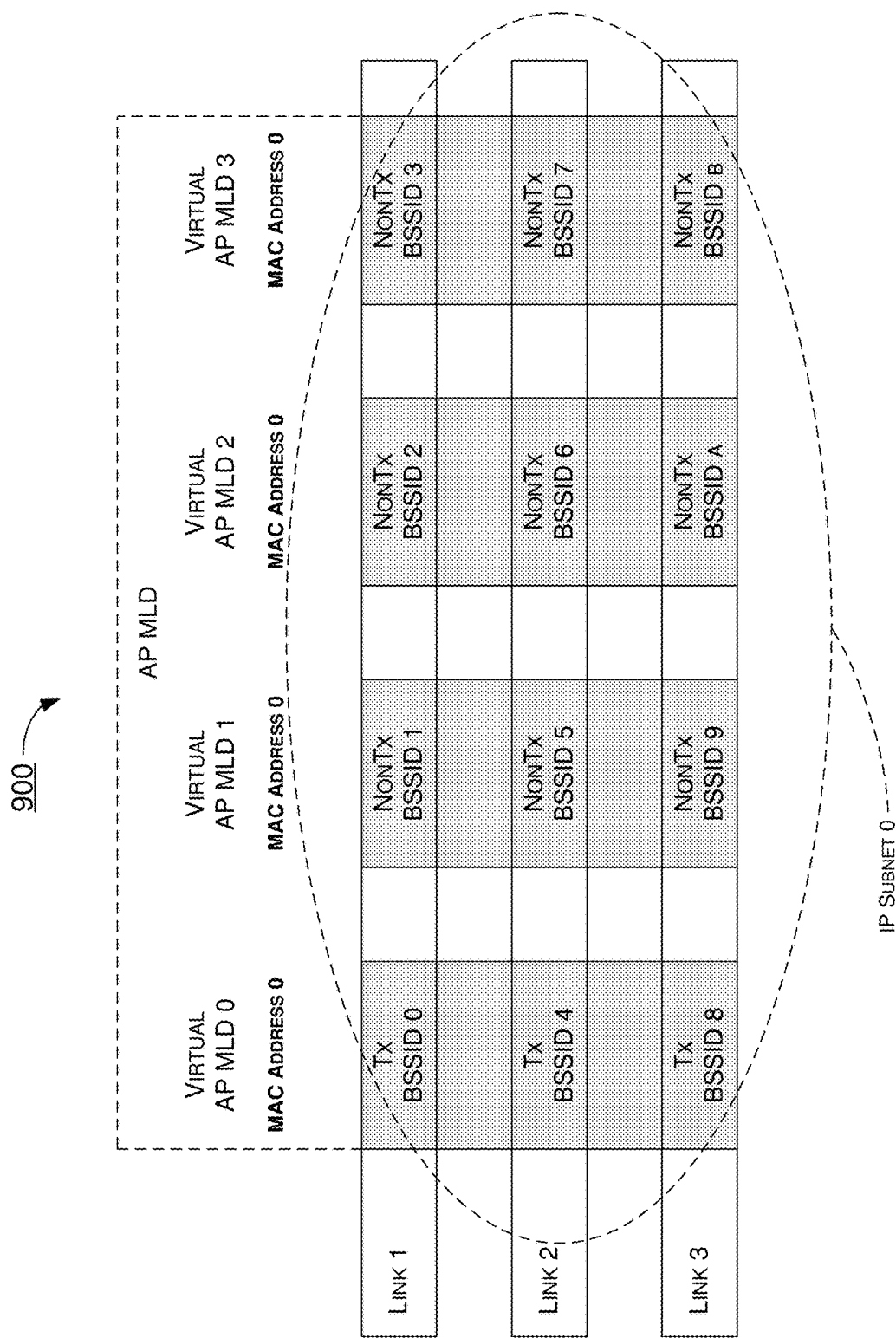
FIG. 9 is a diagram of an example scenario in accordance with the present disclosure.

Under a proposed scheme in accordance with the present disclosure, when a multi-link operation is served in a multiple-BSSID environment, multiple AP MLDs may be virtualized as in the case when multiple APs are virtualized on each link of multiple links using a single AP MLD MAC address. FIG. 9 illustrates an example scenario 900 with respect to multiple-BSSID support in multi-link operation for single AP MLD MAC address in accordance with the present disclosure. In scenario 900, a single physical AP MLD may have multiple virtual APs (or virtual AP MLDs) associated therewith, such as: virtual AP MLD 0, virtual AP MLD 1, virtual AP MLD 2 and virtual AP MLD 3. Moreover, in scenario 900, for multi-link operations with support for multiple BSSIDs, each of the virtual AP MLDs may operate (e.g., transmit) on each of one or more of multiple links under a respective BSSID. For instance, virtual AP MLD 0 may operate on link 1, link 2 and link 3 under a Tx BSSID 0, Tx BSSID 4 and Tx BSSID 8, respectively. Similarly, virtual AP MLD 1 may operate on link 1, link 2 and link 3 under NonTx BSSID 1, NonTx BSSID 5 and NonTx BSSID 9, respectively. Likewise, virtual AP MLD 2 may operate on link 1, link 2 and link 3 under NonTx BSSID 2, NonTx BSSID 6 and NonTx BSSID a, respectively. Additionally, virtual AP MLD 3 may operate on link 1, link 2 and link 3 under NonTx BSSID 3, NonTx BSSID 7 and NonTx BSSID b, respectively.

Under the proposed scheme, all the virtual AP MLDs may have the same AP MLD MAC address and all the virtual AP MLDs may establish a same IP subnet (e.g., IP subnet 0). For instance, a BSSID field indicated in the MAC address header in the multi-link setup request and response frames may be used to determine the virtual AP MLD with which a STA MLD is associated. In scenario 900, each of virtual AP MLD 0, virtual AP MLD 1, virtual AP MLD 2 and virtual AP MLD 3 of a physical AP MLD may have the same MAC address (e.g., MAC address 0). For instance, each of virtual AP MLD 0, virtual AP MLD 1, virtual AP MLD 2, and virtual AP MLD 3 may be assigned an AP MLD MAC address 0, which may correspond to an IP subnet 0 on link 1, link 2 and link 3.

Under the proposed scheme, each virtual AP MLD may be constituted from the non-transmitted BSSIDs having the same BSSID index or the transmitted BSSIDs. In case a virtual AP MLD is allowed to be constituted from the non-transmitted BSSIDs having different BSSID indices or from a combination of transmitted BSSID(s) and non-transmitted BSSID(s), the AP MLD may need additional signaling to configure the BSSIDs belonging to the same virtual AP MLD.

Under a proposed scheme in accordance with the present disclosure, capabilities and operational parameters of virtual AP MLDs having the same MAC address in multi-link operations may be signaled in a certain way. For instance, Tx BSSID 0 may transmit a Beacon frame that contains the capabilities and operational parameters of Tx BSSID 0. Additionally, the Beacon frame may also include Multiple-BSSID IEs that contain the capabilities and operational parameters of NonTx BSSID 1, NonTx BSSID 2 and NonTx BSSID 3. Moreover, the Beacon frame may further include Multiple-Link IEs that contain the capabilities and operational parameters of Tx BSSID 4 and Tx BSSID 8.

In the Multiple-BSSID IE of the Beacon frame, the Multiple-Link IE of the non-transmitted BSSID profile sub-element associated with BSSID index 1 may contain the capabilities and operational parameters of NonTx BSSID 5 and NonTx BSSID 9. Similarly, the Multiple-Link IE of the non-transmitted BSSID profile sub-element associated with BSSID index 2 may contain the capabilities and operational parameters of NonTx BSSID 6 and NonTx BSSID a. Likewise, the Multiple-Link IE of the non-transmitted BSSID profile sub-element associated with BSSID index 3 may contain the capabilities and operational parameters of NonTx BSSID 7 and NonTx BSSID b.

Under a proposed scheme in accordance with the present disclosure, change sequences in multi-link operations may be signaled in a certain way. For instance, the Beacon frame, which is transmitted by Tx BSSID 0, may contain the change sequence of Tx BSSID0. Moreover, the Multiple-BSSID IE in the Beacon frame may contain the change sequences of NonTx BSSID 1, NonTx BSSID2 and NonTx BSSID3. Furthermore, the Multiple-Link IE in the Beacon frame may also contain the change sequences of Tx BSSID 4 and Tx BSSID 8. In the Multiple-BSSID IE of the Beacon frame, the Multiple-Link IE of the non-transmitted BSSID profile sub-element associated with BSSID index 1 may contain the change sequences of NonTx BSSID 5 and NonTx BSSID 9. Similarly, the Multiple-Link IE of the non-transmitted BSSID profile sub-element associated with BSSID index 2 may contain the change sequences of NonTx BSSID 6 and NonTx BSSID a. Likewise, the Multiple-Link IE of the non-transmitted BSSID profile sub-element associated with BSSID index 3 may contain the change sequences of NonTx BSSID 7 and NonTx BSSID b.

FIG. 10 illustrates an example design of a Beacon frame 1000 with respect to multiple-BSSID support in multi-link operation for a same AP MLD MAC address in accordance with the present disclosure. Referring to FIG. 10, Beacon frame 1000 may contain a plurality of informational fields such as, for example and without limitation, Timestamp, Beacon Interval, Capability Information, Service Set Identifier (SSID), Change Sequence, Multiple BSSID, Reduced Neighbor Report (RNR), AP MLD MAC Address, and Multiple Link. The Change Sequence field may be utilized to provide the Change Sequence associated with the transmitted BSSID. The Multiple BSSID field may be utilized to provide the non-transmitted BSSIDs on link(s) associated with the transmitted BSSID. The RNR field may be utilized to provide the Link ID mapping to the operating class, the channel number, and the BSSID for each link. The AP MLD MAC Address field may be utilized to provide the MAC address of the AP MLD. The Multiple Link field may be utilized to provide the BSSIDs in other links that are constituting the AP MLD with the transmitted BSSID.

Under a proposed scheme in accordance with the present disclosure, the designs of Multiple-BSSID IE, Multiple-Link IE, and Reduced Neighbor Report IE for implementations in which multiple virtual AP MLDs share the same MAC address may be identical to those for implementations in which multiple virtual AP MLDs have different respective MAC addresses, as shown in FIG. 6, FIG. 7 and FIG. 8 and as described above. Thus, in the interest of brevity, additional figures and description are not provided so as to avoid redundancy.

Illustrative Implementations

Figure 11:
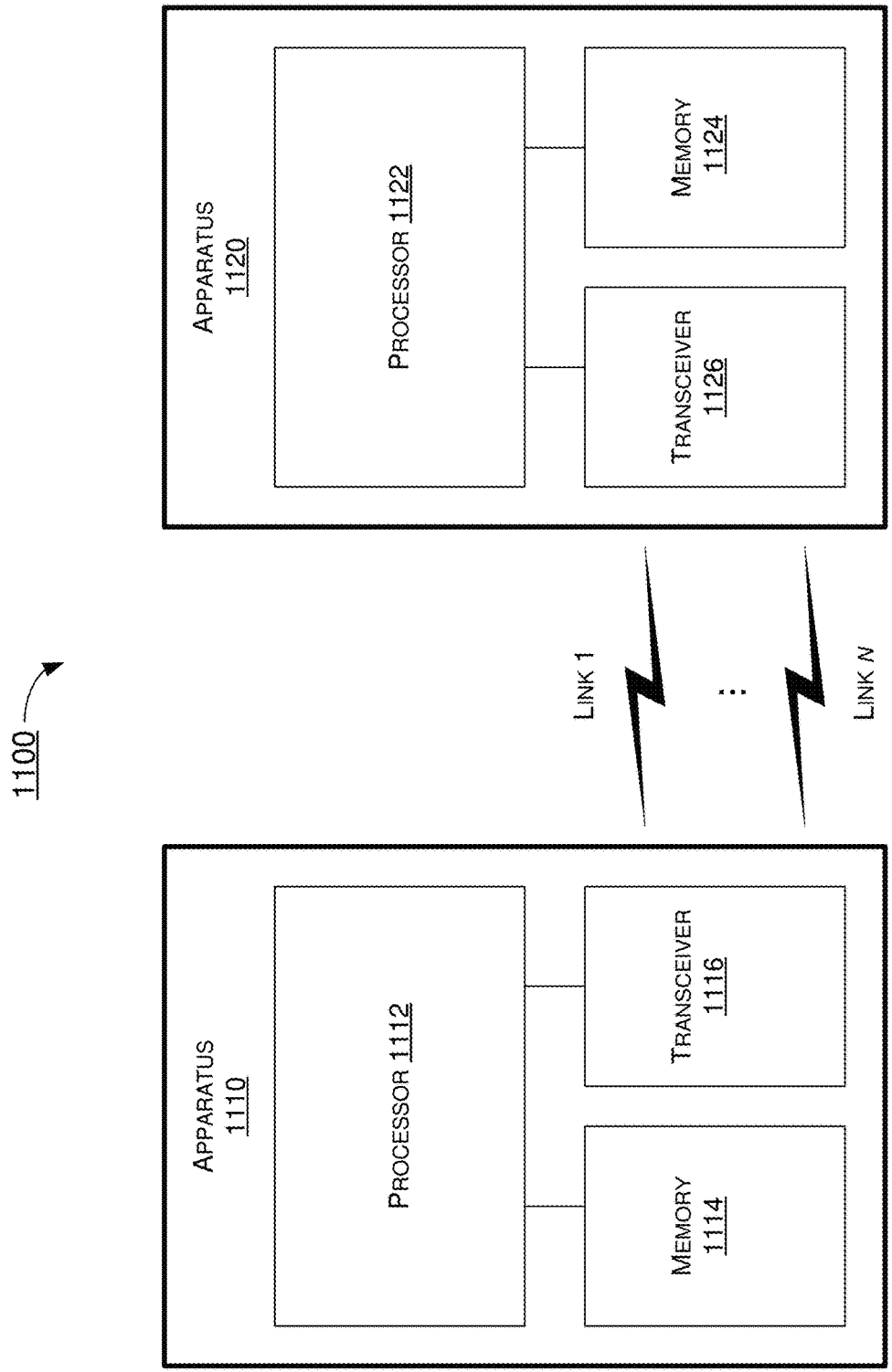
FIG. 11 is a block diagram of an example communication system in accordance with an implementation of the present disclosure.

FIG. 11 illustrates an example system 1100 having at least an example apparatus 1110 and an example apparatus 1120 in accordance with an implementation of the present disclosure. Each of apparatus 1110 and apparatus 1120 may perform various functions to implement schemes, techniques, processes and methods described herein pertaining to multiple-BSSID support in multi-link operation in wireless communications, including the various schemes described above with respect to various proposed designs, concepts, schemes, systems and methods described above as well as processes described below. For instance, apparatus 1110 may be an example implementation of STA 110, and apparatus 1120 may be an example implementation of STA 120.

Each of apparatus 1110 and apparatus 1120 may be a part of an electronic apparatus, which may be a STA or an AP, such as a portable or mobile apparatus, a wearable apparatus, a wireless communication apparatus or a computing apparatus. For instance, each of apparatus 1110 and apparatus 1120 may be implemented in a smartphone, a smart watch, a personal digital assistant, a digital camera, or a computing equipment such as a tablet computer, a laptop computer or a notebook computer. Each of apparatus 1110 and apparatus 1120 may also be a part of a machine type apparatus, which may be an IoT apparatus such as an immobile or a stationary apparatus, a home apparatus, a wire communication apparatus or a computing apparatus. For instance, each of apparatus 1110 and apparatus 1120 may be implemented in a smart thermostat, a smart fridge, a smart door lock, a wireless speaker or a home control center. When implemented in or as a network apparatus, apparatus 1110 and/or apparatus 1120 may be implemented in a network node, such as an AP in a WLAN.

In some implementations, each of apparatus 1110 and apparatus 1120 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1110 and apparatus 1120 may be implemented in or as a STA or an AP. Each of apparatus 1110 and apparatus 1120 may include at least some of those components shown in FIG. 11 such as a processor 1112 and a processor 1122, respectively, for example. Each of apparatus 1110 and apparatus 1120 may further include one or more other components not pertinent to the proposed scheme of the present disclosure (e.g., internal power supply, display device and/or user interface device), and, thus, such component(s) of apparatus 1110 and apparatus 1120 are neither shown in FIG. 11 nor described below in the interest of simplicity and brevity.

In one aspect, each of processor 1112 and processor 1122 may be implemented in the form of one or more single-core processors, one or more multi-core processors, one or more RISC processors or one or more CISC processors. That is, even though a singular term "a processor" is used herein to refer to processor 1112 and processor 1122, each of processor 1112 and processor 1122 may include multiple processors in some implementations and a single processor in other implementations in accordance with the present disclosure. In another aspect, each of processor 1112 and processor 1122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1112 and processor 1122 is a special-purpose machine specifically designed, arranged and configured to perform specific tasks including those pertaining to multiple-BSSID support in multi-link operation in wireless communications in accordance with various implementations of the present disclosure.

In some implementations, apparatus 1110 may also include a transceiver 1116 coupled to processor 1112. Transceiver 1116 may be capable of wirelessly transmitting and receiving data. In some implementations, apparatus 1120 may also include a transceiver 1126 coupled to processor 1122. Transceiver 1126 may include a transceiver capable of wirelessly transmitting and receiving data.

In some implementations, apparatus 1110 may further include a memory 1114 coupled to processor 1112 and capable of being accessed by processor 1112 and storing data therein. In some implementations, apparatus 1120 may further include a memory 1124 coupled to processor 1122 and capable of being accessed by processor 1122 and storing data therein. Each of memory 1114 and memory 1124 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1114 and memory 1124 may include a type of read-only memory (ROM) such as mask ROM, programmable ROM (PROM), erasable programmable ROM (EPROM) and/or electrically erasable programmable ROM (EEPROM). Alternatively, or additionally, each of memory 1114 and memory 1124 may include a type of non-volatile random-access memory (NVRAM) such as flash memory, solid-state memory, ferroelectric RAM (FeRAM), magnetoresistive RAM (MRAM) and/or phase-change memory.

Each of apparatus 1110 and apparatus 1120 may be a communication entity capable of communicating with each other using various proposed schemes in accordance with the present disclosure. For illustrative purposes and without limitation, a description of capabilities of apparatus 1110, as STA 110, and apparatus 1120, as STA 120, is provided below. It is noteworthy that, although the example implementations described below are provided in the context of WLAN, the same may be implemented in other types of networks. Thus, although the following description of example implementations pertains to a scenario in which apparatus 1110 functions as a transmitting device and apparatus 1120 functions as a receiving device, the same is also applicable to another scenario in which apparatus 1110 functions as a receiving device and apparatus 1120 functions as a transmitting device.

Under a proposed scheme with respect to multiple-BSSID support in multi-link operation in wireless communications in accordance with the present disclosure, processor 1112 of apparatus 1110 may assign a plurality of different MAC addresses to a plurality of virtual AP MLDs that are implemented within apparatus 1110 as a physical AP MLD such that each of the plurality of virtual AP MLDs is assigned a respective MAC address of the plurality of different MAC addresses. Additionally, processor 1112 may establish, via transceiver 1116, wireless communications with one or more STAs (including apparatus 1120 as a STA) over a plurality of links (shown as link 1~link n in FIG. 11, with n>1).

In some implementations, in establishing the wireless communications with the one or more STAs over the plurality of links, processor 1112 may operate each of the plurality of virtual AP MLDs on each of the plurality of links under a respective one of a plurality of different BSSIDs.

In some implementations, in establishing the wireless communications with the one or more STAs over the plurality of links, processor 1112 may further operate a plurality of different IP subnets over the plurality of links, with each of the plurality of different IP subnets corresponding to a respective one of the plurality of virtual AP MLDs.

In some implementations, each of the plurality of different IP subnets may be operated by the respective one of the plurality of virtual AP MLDs over one or more links of the plurality of links.

In some implementations, a first virtual AP MLD of the plurality of virtual AP MLDs executed by processor 1112 may transmit, via transceiver 1116, a beacon frame containing capabilities and operating parameters of a first BSSID of the plurality of different BSSIDs under which the first virtual AP MLD operates on at least a first link of the plurality of links.

In some implementations, the beacon frame may also include a Multiple-Link IE containing capabilities and operating parameters of a third BSSID of the plurality of different BSSIDs under which the first virtual AP MLD operates on a second link of the plurality of links.

In some implementations, the beacon frame may further include a Multiple-Link IE that carries one or more Multiple Link Profile sub-elements with each of the one or more Multiple Link Profile sub-elements including a link ID field and a capability information field. In such cases, the link ID filed may indicate a respective link ID associated with a respective link with a mapping between the respective link and the respective link ID defined in the RNR element in the beacon frame. Moreover, the capability information field may indicate a capability of an AP in the AP MLD operating on the respective link.

In some implementations, each of the one or more Multiple Link Profile sub-elements may also include a DTIM period field and a DTIM count field. In such cases, the DTIM period field may indicate a DTIM period of the AP in the AP MLD operating on the respective link. Additionally, the DTIM count field may indicate a DTIM count of the AP in the AP MLD operating on the respective link.

In some implementations, the Multiple-Link IE may further contain one or more of the following: (a) one or more BSSIDs of the plurality of different BSSIDs on the first link and associated with the first virtual AP MLD, (b) a reduced neighbor report that provides a link ID mapping to a respective operating class, a respective channel number, and a respective BSSID of each link of the plurality of links, and (c one or more other BSSIDs on one or more other links other than the first link and associated with the first virtual AP MLD.

In some implementations, the beacon frame may also include a Multiple-BSSID IE containing capabilities and operating parameters of a second BSSID of the plurality of different BSSIDs under which a second virtual AP MLD of the plurality of virtual AP MLDs operates.

In some implementations, the Multiple-BSSID IE may also contain a first Multiple-Link IE. In some cases, the first Multiple-Link IE may have a first BSSID profile sub-element associated with the first BSSID. Moreover, the first Multiple-Link IE may contain a first MAC address of the first virtual AP MLD.

In some implementations, the first Multiple-Link IE may also contain a change request of at least a third BSSID of the plurality of different BSSIDs under which the first virtual AP MLD operates on a second link of the plurality of links.

In some implementations, the Multiple-BSSID IE may further contain a second Multiple-Link IE. In such cases, the second Multiple-Link IE may have a second BSSID profile sub-element associated with a second BSSID of the plurality of different BSSIDs under which a second virtual AP MLD of the plurality of virtual AP MLDs operates on one or more links of the plurality of links. Moreover, the second Multiple-Link IE may contain a second MAC address of the second virtual AP MLD.

In some implementations, the second Multiple-Link IE may further contain either or both of: (a) a change request of a fourth BSSID of the plurality of different BSSIDs under which the second virtual AP MLD operates on one or more links of the plurality of links, and (b) a change request of a fifth BSSID of the plurality of different BSSIDs under which a third virtual AP MLD of the plurality of virtual AP MLDs operates on another one or more links of the plurality of links.

In some implementations, the Multiple-BSSID IE may further contain a change request of at least a second BSSID of the plurality of different BSSIDs under which a second virtual AP MLD of the plurality of virtual AP MLDs operates on one or more links of the plurality of links.

Under a proposed scheme with respect to multiple-BSSID support in multi-link operation in wireless communications in accordance with the present disclosure, processor 1122 of apparatus 1120 may establish, via transceiver 1126, a wireless communication with a first virtual AP MLD of a plurality of virtual AP MLDs that are implemented within a physical AP MLD (e.g., apparatus 1110) over a first link of a plurality of links. Accordingly, each of the plurality of virtual AP MLDs may be assigned a respective MAC address of a plurality of different MAC addresses. Moreover, each of the plurality of virtual AP MLDs may operate on each of the plurality of links under a respective one of a plurality of different BSSIDs. Moreover, processor 1122 may receive, via transceiver 1126, from the first virtual AP MLD a beacon frame containing capabilities and operating parameters of a first BSSID of the plurality of different BSSIDs under which the first virtual AP MLD operates on at least the first link of the plurality of links.

In some implementations, the AP MLD may operate a plurality of different IP subnets over the plurality of links. Accordingly, each of the plurality of different IP subnets may correspond to a respective one of the plurality of virtual AP MLDs. Moreover, each of the plurality of different IP subnets may be operated by the respective one of the plurality of virtual AP MLDs over one or more links of the plurality of links.

In some implementations, the beacon frame may also include a Multiple-Link IE containing capabilities and operating parameters of a third BSSID of the plurality of different BSSIDs under which the first virtual AP MLD operates on a second link of the plurality of links. Moreover, the Multiple-Link IE may also contain one or more of: (a) one or more BSSIDs of the plurality of different BSSIDs on the first link and associated with the first virtual AP MLD, (b) a reduced neighbor report that provides a link ID mapping to a respective operating class, a respective channel number, and a respective BSSID of each link of the plurality of links, and (c) one or more other BSSIDs on one or more other links other than the first link and associated with the first virtual AP MLD.

In some implementations, the beacon frame may further include a Multiple-BSSID IE containing capabilities and operating parameters of a second BSSID of the plurality of different BSSIDs under which a second virtual AP MLD of the plurality of virtual AP MLDs operates.

In some implementations, the Multiple-BSSID IE may further contain a first Multiple-Link IE. In some cases, the first Multiple-Link IE may have a first BSSID profile sub-element associated with the first BSSID. Moreover, the first Multiple-Link IE may contain a first MAC address of the first virtual AP MLD. Furthermore, the Multiple-BSSID IE may also contain a change request of at least a second BSSID of the plurality of different BSSIDs under which a second virtual AP MLD of the plurality of virtual AP MLDs operates on one or more links of the plurality of links.

In some implementations, the first Multiple-Link IE may further contain a change request of at least a third BSSID of the plurality of different BSSIDs under which the first virtual AP MLD operates on a second link of the plurality of links.

In some implementations, the Multiple-BSSID IE may further contain a second Multiple-Link IE. In some cases, the second Multiple-Link IE may have a second BSSID profile sub-element associated with a second BSSID of the plurality of different BSSIDs under which a second virtual AP MLD of the plurality of virtual AP MLDs operates on one or more links of the plurality of links. Moreover, the second Multiple-Link IE may contain a second MAC address of the second virtual AP MLD. Furthermore, the second Multiple-Link IE may also contain either or both of: (a) a change request of a fourth BSSID of the plurality of different BSSIDs under which the second virtual AP MLD operates on one or more links of the plurality of links, and (b) a change request of a fifth BSSID of the plurality of different BSSIDs under which a third virtual AP MLD of the plurality of virtual AP MLDs operates on another one or more links of the plurality of links.

Illustrative Processes

FIG. 12 illustrates an example process 1200 in accordance with an implementation of the present disclosure. Process 1200 may represent an aspect of implementing various proposed designs, concepts, schemes, systems and methods described above. More specifically, process 1200 may represent an aspect of the proposed concepts and schemes pertaining to multiple-BSSID support in multi-link operation in wireless communications in accordance with the present disclosure. Process 1200 may include one or more operations, actions, or functions as illustrated by one or more of blocks 1210 and 1220. Although illustrated as discrete blocks, various blocks of process 1200 may be divided into additional blocks, combined into fewer blocks, or eliminated, depending on the desired implementation. Moreover, the blocks/sub-blocks of process 1200 may be executed in the order shown in FIG. 12 or, alternatively in a different order. Furthermore, one or more of the blocks/sub-blocks of process 1200 may be executed repeatedly or iteratively. Process 1200 may be implemented by or in apparatus 1110 and apparatus 1120 as well as any variations thereof. Solely for illustrative purposes and without limiting the scope, process 1200 is described below in the context of apparatus 1110 as STA 110 (e.g., a STA or AP) and apparatus 1120 as STA 120 (e.g., a peer STA or AP) of a wireless network such as a WLAN in accordance with one or more of IEEE 802.11 standards. Process 1200 may begin at block 1210.

At 1210, process 1200 may involve processor 1112 of apparatus 1110 assigning a plurality of different MAC addresses to a plurality of virtual AP MLDs that are implemented within apparatus 1110 as a physical AP MLD such that each of the plurality of virtual AP MLDs is assigned a respective MAC address of the plurality of different MAC addresses. Process 1200 may proceed from 1210 to 1220.

At 1220, process 1200 may involve processor 1112 establishing, via transceiver 1116, wireless communications with one or more stations (STAs) (including apparatus 1120 as a STA) over a plurality of links.

In some implementations, in establishing the wireless communications with the one or more STAs over the plurality of links, process 1200 may involve processor 1112 operating each of the plurality of virtual AP MLDs on each of the plurality of links under a respective one of a plurality of different BSSIDs.

In some implementations, in establishing the wireless communications with the one or more STAs over the plurality of links, process 1200 may further involve processor 1112 operating a plurality of different IP subnets over the plurality of links, with each of the plurality of different IP subnets corresponding to a respective one of the plurality of virtual AP MLDs.

In some implementations, each of the plurality of different IP subnets may be operated by the respective one of the plurality of virtual AP MLDs over one or more links of the plurality of links.

In some implementations, process 1200 may further involve a first virtual AP MLD of the plurality of virtual AP MLDs executed by processor 1112 transmitting, via transceiver 1116, a beacon frame containing capabilities and operating parameters of a first BSSID of the plurality of different BSSIDs under which the first virtual AP MLD operates on at least a first link of the plurality of links.

In some implementations, the beacon frame may also include a Multiple-Link IE containing capabilities and operating parameters of a third BSSID of the plurality of different BSSIDs under which the first virtual AP MLD operates on a second link of the plurality of links.

In some implementations, the beacon frame may further include a Multiple-Link IE that carries one or more Multiple Link Profile sub-elements with each of the one or more Multiple Link Profile sub-elements including a link ID field and a capability information field. In such cases, the link ID filed may indicate a respective link ID associated with a respective link with a mapping between the respective link and the respective link ID defined in the RNR element in the beacon frame. Moreover, the capability information field may indicate a capability of an AP in the AP MLD operating on the respective link.

In some implementations, each of the one or more Multiple Link Profile sub-elements may also include a DTIM period field and a DTIM count field. In such cases, the DTIM period field may indicate a DTIM period of the AP in the AP MLD operating on the respective link. Additionally, the DTIM count field may indicate a DTIM count of the AP in the AP MLD operating on the respective link.

In some implementations, the Multiple-Link IE may further contain one or more of the following: (a) one or more BSSIDs of the plurality of different BSSIDs on the first link and associated with the first virtual AP MLD, (b) a reduced neighbor report that provides a link ID mapping to a respective operating class, a respective channel number, and a respective BSSID of each link of the plurality of links, and (c) one or more other BSSIDs on one or more other links other than the first link and associated with the first virtual AP MLD.

In some implementations, the beacon frame may also include a Multiple-BSSID IE containing capabilities and operating parameters of a second BSSID of the plurality of different BSSIDs under which a second virtual AP MLD of the plurality of virtual AP MLDs operates.

In some implementations, the Multiple-BSSID IE may also contain a first Multiple-Link IE. In some cases, the first Multiple-Link IE may have a first BSSID profile sub-element associated with the first BSSID. Moreover, the first Multiple-Link IE may contain a first MAC address of the first virtual AP MLD.

In some implementations, the first Multiple-Link IE may also contain a change request of at least a third BSSID of the plurality of different BSSIDs under which the first virtual AP MLD operates on a second link of the plurality of links.

In some implementations, the Multiple-BSSID IE may further contain a second Multiple-Link IE. In such cases, the second Multiple-Link IE may have a second BSSID profile sub-element associated with a second BSSID of the plurality of different BSSIDs under which a second virtual AP MLD of the plurality of virtual AP MLDs operates on one or more links of the plurality of links. Moreover, the second Multiple-Link IE may contain a second MAC address of the second virtual AP MLD.

In some implementations, the second Multiple-Link IE may further contain either or both of: (a) a change request of a fourth BSSID of the plurality of different BSSIDs under which the second virtual AP MLD operates on one or more links of the plurality of links, and (b) a change request of a fifth BSSID of the plurality of different BSSIDs under which a third virtual AP MLD of the plurality of virtual AP MLDs operates on another one or more links of the plurality of links.

In some implementations, the Multiple-BSSID IE may further contain a change request of at least a second BSSID of the plurality of different BSSIDs under which a second virtual AP MLD of the plurality of virtual AP MLDs operates on one or more links of the plurality of links.

FIG. 13 illustrates an example process 1300 in accordance with an implementation of the present disclosure. Process 1300 may represent an aspect of implementing various proposed designs, concepts, schemes, systems and methods described above. More specifically, process 1300 may represent an aspect of the proposed concepts and schemes pertaining to multiple-BSSID support in multi-link operation in wireless communications in accordance with the present disclosure. Process 1300 may include one or more operations, actions, or functions as illustrated by one or more of blocks 1310 and 1320. Although illustrated as discrete blocks, various blocks of process 1300 may be divided into additional blocks, combined into fewer blocks, or eliminated, depending on the desired implementation. Moreover, the blocks/sub-blocks of process 1300 may be executed in the order shown in FIG. 13 or, alternatively in a different order. Furthermore, one or more of the blocks/sub-blocks of process 1300 may be executed repeatedly or iteratively. Process 1300 may be implemented by or in apparatus 1110 and apparatus 1120 as well as any variations thereof. Solely for illustrative purposes and without limiting the scope, process 1300 is described below in the context of apparatus 1110 as STA 110 (e.g., a STA or AP) and apparatus 1120 as STA 120 (e.g., a peer STA or AP) of a wireless network such as a WLAN in accordance with one or more of IEEE 802.11 standards. Process 1300 may begin at block 1310.

At 1310, process 1300 may involve processor 1122 of apparatus 1120 establishing, via transceiver 1126, a wireless communication with a first virtual AP MLD of a plurality of virtual AP MLDs that are implemented within a physical AP MLD (e.g., apparatus 1110) over a first link of a plurality of links. Accordingly, each of the plurality of virtual AP MLDs may be assigned a respective MAC address of a plurality of different MAC addresses. Moreover, each of the plurality of virtual AP MLDs may operate on each of the plurality of links under a respective one of a plurality of different BSSIDs. Process 1300 may proceed from 1310 to 1320.

At 1320, process 1300 may involve processor 1122 receiving, via transceiver 1126, from the first virtual AP MLD a beacon frame containing capabilities and operating parameters of a first BSSID of the plurality of different BSSIDs under which the first virtual AP MLD operates on at least the first link of the plurality of links.

In some implementations, the AP MLD may operate a plurality of different IP subnets over the plurality of links. Accordingly, each of the plurality of different IP subnets may correspond to a respective one of the plurality of virtual AP MLDs. Moreover, each of the plurality of different IP subnets may be operated by the respective one of the plurality of virtual AP MLDs over one or more links of the plurality of links.

In some implementations, the beacon frame may also include a Multiple-Link IE containing capabilities and operating parameters of a third BSSID of the plurality of different BSSIDs under which the first virtual AP MLD operates on a second link of the plurality of links. Moreover, the Multiple-Link IE may also contain one or more of: (a) one or more BSSIDs of the plurality of different BSSIDs on the first link and associated with the first virtual AP MLD, (b) a reduced neighbor report that provides a link ID mapping to a respective operating class, a respective channel number, and a respective BSSID of each link of the plurality of links, and (c) one or more other BSSIDs on one or more other links other than the first link and associated with the first virtual AP MLD.

In some implementations, the beacon frame may further include a Multiple-BSSID IE containing capabilities and operating parameters of a second BSSID of the plurality of different BSSIDs under which a second virtual AP MLD of the plurality of virtual AP MLDs operates.

In some implementations, the Multiple-BSSID IE may further contain a first Multiple-Link IE. In some cases, the first Multiple-Link IE may have a first BSSID profile sub-element associated with the first BSSID. Moreover, the first Multiple-Link IE may contain a first MAC address of the first virtual AP MLD. Furthermore, the Multiple-BSSID IE may also contain a change request of at least a second BSSID of the plurality of different BSSIDs under which a second virtual AP MLD of the plurality of virtual AP MLDs operates on one or more links of the plurality of links.

In some implementations, the first Multiple-Link IE may further contain a change request of at least a third BSSID of the plurality of different BSSIDs under which the first virtual AP MLD operates on a second link of the plurality of links.

In some implementations, the Multiple-BSSID IE may further contain a second Multiple-Link IE. In some cases, the second Multiple-Link IE may have a second BSSID profile sub-element associated with a second BSSID of the plurality of different BSSIDs under which a second virtual AP MLD of the plurality of virtual AP MLDs operates on one or more links of the plurality of links. Moreover, the second Multiple-Link IE may contain a second MAC address of the second virtual AP MLD. Furthermore, the second Multiple-Link IE may also contain either or both of: (a) a change request of a fourth BSSID of the plurality of different BSSIDs under which the second virtual AP MLD operates on one or more links of the plurality of links, and (b) a change request of a fifth BSSID of the plurality of different BSSIDs under which a third virtual AP MLD of the plurality of virtual AP MLDs operates on another one or more links of the plurality of links.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   establishing a multi-basic service set identifier (multi-BSSID) environment with a plurality of virtual access point (AP) multi-link devices (MLDs) implemented within a physical AP MLD; and
   wirelessly communicating with one or more stations (STAs) over a plurality of links in a multi-link operation,
   wherein each virtual AP MLD of the plurality of AP MLDs has a respective AP MLD medium access control (MAC) address used in establishing a respective administrative domain over the plurality of links, and
   wherein each virtual AP MLD of the plurality of AP MLDs is associated with a respective plurality of BSSIDs each of which corresponding to a respective link of the plurality of links.

2. The method of claim 1, wherein the communicating with the one or more STAs comprises transmitting one or more beacon frames over one or more links of the plurality of links, and wherein each beacon frame of the one or more beacon frames contains a plurality of fields comprising at least a Change sequence field, a Multiple BSSID field, a Reduced Neighbor Report field, and a Multiple Link field.

3. The method of claim 2, wherein:
   the Change sequence field indicates a change sequence associated with a transmitted BSSID,
   the Multiple BSSID field indicates one or more non-transmitted BSSIDs on one or more links of the plurality of links associated with the transmitted BSSID,
   the Reduced Neighbor Report field indicates a Link identifier (ID) mapping to an operating class, a channel number, and a respective BSSID corresponding to each link, and
   the Multiple Link field indicates one or more BSSIDs corresponding to other links associated with one of the virtual AP MLDs having the transmitted BSSID.

4. An apparatus, comprising:
   a transceiver configured to communicate wirelessly; and
   a processor coupled to the transceiver and configured to perform, via the transceiver, operations comprising:
      assigning a plurality of different medium access control (MAC) addresses to a plurality of virtual access point (AP) multi-link devices (MLDs) that are implemented within a physical AP MLD such that each of the plurality of virtual AP MLDs is assigned a respective MAC address of the plurality of different MAC addresses; and
      establishing wireless communications with one or more stations (STAs) over a plurality of links,
   wherein the establishing the wireless communications with the one or more STAs over the plurality of links comprises transmitting, by a first virtual AP MLD of the plurality of virtual AP MLDs, a frame comprising a Multiple-Link information element (IE) carrying one or more Multiple Link Profile sub-elements with each of the one or more Multiple Link Profile sub-elements comprising a delivery traffic indication message (DTIM) period field and a DTIM count field,
   wherein the DTIM period field indicates a DTIM period of the AP in the AP MLD operating on the respective link, and
   wherein the DTIM count field indicates a DTIM count of the AP in the AP MLD operating on the respective link.

5. The apparatus of claim 4, wherein the establishing the wireless communications with the one or more STAs over the plurality of links further comprises operating each of the plurality of virtual AP MLDs on each of the plurality of links under a respective one of a plurality of different basic service set identifiers (BSSIDs).

6. The apparatus of claim 5, wherein the frame further comprises capabilities and operating parameters of a first BSSID of the plurality of different BSSIDs under which the first virtual AP MLD operates on at least a first link of the plurality of links.

7. The apparatus of claim 4, wherein the Multiple-Link IE further contains capabilities and operating parameters of a third BSSID of the plurality of different BSSIDs under which the first virtual AP MLD operates on a second link of the plurality of links, and wherein the Multiple-Link IE further contains one or more of:
one or more BSSIDs of the plurality of different BSSIDs on the first link and associated with the first virtual AP MLD,
a reduced neighbor report that provides a link identifier (ID) mapping to a respective operating class, a respective channel number, and a respective BSSID of each link of the plurality of links, and
one or more other BSSIDs on one or more other links other than the first link and associated with the first virtual AP MLD.

8. The apparatus of claim 4, wherein each of the one or more Multiple Link Profile sub-elements further comprises a link identifier (ID) field and a capability information field, wherein the link ID filed indicates a respective link ID associated with a respective link with a mapping between the respective link and the respective link ID defined in a Reduced Neighbor Report (RNR) element in the frame, and wherein the capability information field indicates a capability of an AP in the AP MLD operating on the respective link.

9. The apparatus of claim 4, wherein the frame further comprises a Multiple-BSSID IE containing capabilities and operating parameters of a second BSSID of the plurality of different BSSIDs under which a second virtual AP MLD of the plurality of virtual AP MLDs operates.

10. The apparatus of claim 9, wherein the Multiple-BSSID IE further contains a change request of at least a second BSSID of the plurality of different BSSIDs under which a second virtual AP MLD of the plurality of virtual AP MLDs operates on one or more links of the plurality of links.

11. The apparatus of claim 9, wherein the Multiple-BSSID IE further contains a first Multiple-Link IE, wherein the first Multiple-Link IE has a first BSSID profile sub-element associated with the first BSSID, and wherein the first Multiple-Link IE contains a first MAC address of the first virtual AP MLD.

12. The apparatus of claim 11, wherein the first Multiple-Link IE further contains a change request of at least a third BSSID of the plurality of different BSSIDs under which the first virtual AP MLD operates on a second link of the plurality of links.

13. The apparatus of claim 11, wherein the Multiple-BSSID IE further contains a second Multiple-Link IE, wherein the second Multiple-Link IE has a second BSSID profile sub-element associated with a second BSSID of the plurality of different BSSIDs under which a second virtual AP MLD of the plurality of virtual AP MLDs operates on one or more links of the plurality of links, wherein the second Multiple-Link IE contains a second MAC address of the second virtual AP MLD, and wherein the second Multiple-Link IE further contains either or both of:
a change request of a fourth BSSID of the plurality of different BSSIDs under which the second virtual AP MLD operates on one or more links of the plurality of links, and
a change request of a fifth BSSID of the plurality of different BSSIDs under which a third virtual AP MLD of the plurality of virtual AP MLDs operates on another one or more links of the plurality of links.

14. An apparatus, comprising:
a transceiver configured to communicate wirelessly; and
a processor coupled to the transceiver and configured to perform, via the transceiver, operations comprising:
establishing a wireless communication with a first virtual access point (AP) multi-link device (MLD) of a plurality of virtual AP MLDs that are implemented within a physical AP MLD over a first link of a plurality of links such that:
each of the plurality of virtual AP MLDs is assigned a respective medium access control (MAC) address of a plurality of different MAC addresses, and
each of the plurality of virtual AP MLDs operates on each of the plurality of links under a respective one of a plurality of different basic service set identifiers (BSSIDs); and
receiving, from the first virtual AP MLD, a frame containing capabilities and operating parameters of a first BSSID of the plurality of different BSSIDs under which the first virtual AP MLD operates on at least the first link of the plurality of links,
wherein the frame further comprises a Multiple-Link information element (IE) carrying one or more Multiple Link Profile sub-elements with each of the one or more Multiple Link Profile sub-elements comprising a delivery traffic indication message (DTIM) period field and a DTIM count field,
wherein the DTIM period field indicates a DTIM period of the AP in the AP MLD operating on the respective link, and
wherein the DTIM count field indicates a DTIM count of the AP in the AP MLD operating on the respective link.

15. The apparatus of claim 14, wherein the AP MLD operates a plurality of different Internet Protocol (IP) subnets over the plurality of links, wherein each of the plurality of different IP subnets corresponds to a respective one of the plurality of virtual AP MLDs, and wherein each of the plurality of different IP subnets is operated by the respective one of the plurality of virtual AP MLDs over one or more links of the plurality of links.

16. The apparatus of claim 14, wherein the Multiple-Link IE further contains capabilities and operating parameters of a third BSSID of the plurality of different BSSIDs under which the first virtual AP MLD operates on a second link of the plurality of links, and wherein the Multiple-Link IE further contains one or more of:
one or more BSSIDs of the plurality of different BSSIDs on the first link and associated with the first virtual AP MLD,
a reduced neighbor report that provides a link identifier (ID) mapping to a respective operating class, a respective channel number, and a respective BSSID of each link of the plurality of links, and
one or more other BSSIDs on one or more other links other than the first link and associated with the first virtual AP MLD.

17. The apparatus of claim 14, wherein the frame further comprises a Multiple-BSSID IE containing capabilities and operating parameters of a second BSSID of the plurality of different BSSIDs under which a second virtual AP MLD of the plurality of virtual AP MLDs operates.

18. The apparatus of claim 17, wherein the Multiple-BSSID IE further contains a first Multiple-Link IE, wherein the first Multiple-Link IE has a first BSSID profile sub-element associated with the first BSSID, wherein the first Multiple-Link IE contains a first MAC address of the first virtual AP MLD, and wherein the Multiple-BSSID IE further contains a change request of at least a second BSSID of the plurality of different BSSIDs under which a second virtual AP MLD of the plurality of virtual AP MLDs operates on one or more links of the plurality of links.

19. The apparatus of claim 18, wherein the first Multiple-Link IE further contains a change request of at least a third BSSID of the plurality of different BSSIDs under which the first virtual AP MLD operates on a second link of the plurality of links.

20. The apparatus of claim 18, wherein the Multiple-BSSID IE further contains a second Multiple-Link IE, wherein the second Multiple-Link IE has a second BSSID profile sub-element associated with a second BSSID of the plurality of different BSSIDs under which a second virtual AP MLD of the plurality of virtual AP MLDs operates on one or more links of the plurality of links, wherein the second Multiple-Link IE contains a second MAC address of the second virtual AP MLD, and wherein the second Multiple-Link IE further contains either or both of:
- a change request of a fourth BSSID of the plurality of different BSSIDs under which the second virtual AP MLD operates on one or more links of the plurality of links, and
- a change request of a fifth BSSID of the plurality of different BSSIDs under which a third virtual AP MLD of the plurality of virtual AP MLDs operates on another one or more links of the plurality of links.

* * * * *